United States Patent
Heidkamp et al.

(10) Patent No.: US 8,654,128 B2
(45) Date of Patent: Feb. 18, 2014

(54) METHOD AND ARRANGEMENT FOR OUTPUTTING RESIDUAL ERRORS FOR A FUNCTION CUSTOMIZED TO A SET OF POINTS

(75) Inventors: Marcus Heidkamp, Jena (DE); Stephan Wagner-Conrad, Jena (DE); Klaus Weisshart, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 764 days.

(21) Appl. No.: 12/679,782

(22) PCT Filed: Sep. 16, 2008

(86) PCT No.: PCT/EP2008/007701
§ 371 (c)(1),
(2), (4) Date: Apr. 8, 2010

(87) PCT Pub. No.: WO2009/040016
PCT Pub. Date: Apr. 2, 2009

(65) Prior Publication Data
US 2010/0214297 A1    Aug. 26, 2010

(30) Foreign Application Priority Data
Sep. 25, 2007  (DE) .......................... 10 2007 045 666

(51) Int. Cl.
*G06T 11/20* (2006.01)
(52) U.S. Cl.
USPC ........................................................ 345/440
(58) Field of Classification Search
USPC ........................................................ 345/440
See application file for complete search history.

(56) References Cited

U.S. PATENT DOCUMENTS

| 6,582,907 B1 | 6/2003 | Epps et al. |
| 7,139,432 B2 | 11/2006 | Wenzel et al. |
| 2004/0189944 A1 | 9/2004 | Kaufman et al. |
| 2008/0225021 A1* | 9/2008 | Hekstra et al. ................ 345/204 |

OTHER PUBLICATIONS

Pajevic et al., Color Schemes to Represent the Orientation of Anisotropic Tissues from Diffusion Tensor Data: Application to White Matter Fiber Tract Mapping in the Human Brain, Magnetic Resonance in Medicine, May 24, 1999, pp. 526-540.*

Eduard Schreibmann et al., "Image Interpolation in 4D CT Using a BSPLINE Deformable Registration Model", Int. J. Radiation Oncology Biol. Phys., vol. 64, No. 5, pp. 1537-1550, 2006.

(Continued)

*Primary Examiner* — M Good Johnson
(74) *Attorney, Agent, or Firm* — Frommer Lawrence & Haug LLP

(57) ABSTRACT

The invention is directed to a method and an arrangement for displaying residual errors of a function which is fitted to a set of points. In the prior art, the residual errors are displayed in a separate graph apart from the function graph so that it is difficult for an observer to discern the quality of the fit of the function to the data points. An improved method and an improved arrangement make it possible to visually assess the quality of the fit in a simple, accurate manner. According to the invention, visual codes are assigned to the fitted function or to the data points of the point set piecewise or pointwise depending on the residual errors, and the fitted function is displayed graphically at an interface, wherein the fitted function is displayed piecewise or pointwise in the form of the assigned visual codes. The invention is preferably used for raster image spectroscopy with laser scanning microscopes.

18 Claims, 4 Drawing Sheets

(56) References Cited

OTHER PUBLICATIONS

W. Kornus et al., "DEM Generation From Spot-5 3-Fold Along Track Stereoscopic Imagery Using Autocalibration", ISPRS Journal of Photogrammetry & Remote Sensing, vol. 60, pp. 147-159, 2006.

Marcus Heidkamp "Spin-Coherence and -Dephasing of Donor and Free Conduction Band Electrons across the Metal-Insulator Transition in Si:GaAs"; Diplom-Physiker (Univ.) Marcus Heidkamp (M.A. UT Austin); published: 2004.

Digman et al "Fluctuation correlation spectroscopy with a laser-scanning microscope: exploiting the hidden time structure": Biophys J. BioFAST, published on Mar. 25, 2005 as doi:10.1529/biophysj.105.061788.

Digman et al; "Measuring Fast Dynamics in Solutions and Cells with a laser Scanning Microscope"; Biophysical Journal vol. 89 Aug. 2005 1317-1327.

\* cited by examiner

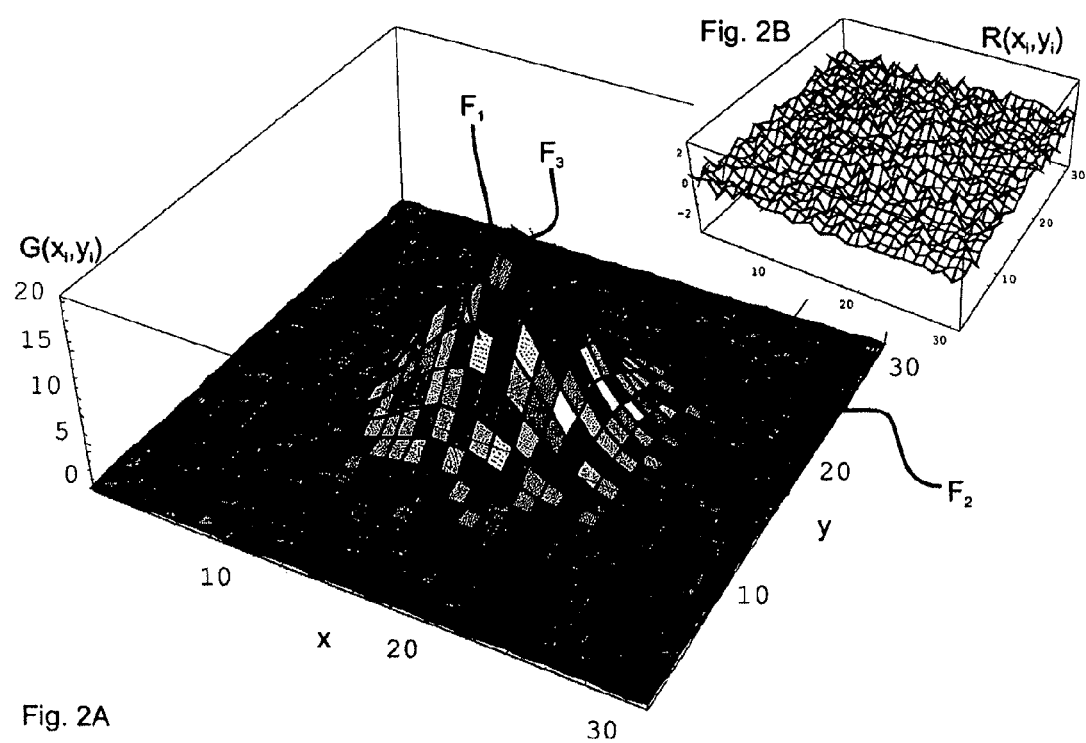

METHOD AND ARRANGEMENT FOR OUTPUTTING RESIDUAL ERRORS FOR A FUNCTION CUSTOMIZED TO A SET OF POINTS

The present application claims priority from PCT Patent Application No. PCT/EP2008/007701 filed on Sep. 16, 2008, which claims priority from German Patent Application No. 10 2007 045 666.4 filed on Sep. 25, 2007, the disclosure of which is incorporated herein by reference in its entirety.

BACKGROUND OF THE INVENTION

1. Field of the Invention

The invention is directed to a method and an arrangement for displaying residual errors of a function which is fitted to a set of points.

2. Description of Related Art

A set of points comprises a plurality of discrete data points. At least two coordinates of a correspondingly multi-dimensional number space and a one-dimensional or multi-dimensional value are assigned to each of these points. The points can directly represent measurement data or can be derived indirectly from measurement data. A fitted function is an implicitly or explicitly defined assignment rule. It may or may not be constant and can be defined continuously or only at discrete points. Fitting to a set of points can be carried out, for example, by varying one or more function parameters within the framework of curve fitting or by other function variations.

Various algorithms are known in the art for fitting a predefinable or predefined function to a set of points by means of curve fitting. An example is the method of least squares deviation. Usually, the residual errors (residuals) of the fitted function are used for detailed assessment of the usefulness of a fit. With the help of these residuals, local deviations of the fitted function are easy to detect. To this end, the residual errors are usually depicted on a graph.

Methods for displaying residual errors of a fitted function are already known from the prior art. For example, Kolin et al. (Biophysical Journal, Vol. 90 (2006), 628-639, 638) show graphs with discrete data points and one-dimensional functions fitted to the data points. A second graph with the associated residuals is shown below every function graph, the graphs being oriented to one another along a coordinate axis.

Digman et al. (Biophysical Journal-Biophysical Letters BioFAST, 105.061788, L01-103, L03; Biophysical Journal, Vol. 89 (2005), 1317-1327, 1321) propose displaying two-dimensional fitted functions in perspective in a pseudo-3D rendering for raster image correlation spectroscopy. The associated residuals are displayed in a second graph, likewise in a perspective pseudo-3D rendering, above the function graph. The two graphs are oriented to one another along two coordinate axes. The data points are not shown in the graph of the fitted function because they cannot be interpreted in the perspective rendering. A color representation of the two graphs depending on the respective vertical coordinate is intended to increase the legibility of the perspective representation.

These known forms of data display have the disadvantage that an observer has difficulty distinguishing the quality of the fit of the function to the data points. With one-dimensional fits and two-dimensional fits, the observer must view two graphs simultaneously in order to obtain information about the quality of the fit. With a two-dimensional fit, the visual assignment of the residual errors to the fitted function is particularly difficult because of the perspective and is therefore inaccurate.

SUMMARY OF THE INVENTION

Therefore, it is the object of the invention to improve a method and an arrangement of the type mentioned above so as to enable a simple and accurate visual assessment of the quality of the fit.

This object is met by a method having the features indicated in claim 1 and by an arrangement having the features indicated in claim 13.

Advantageous embodiments of the invention are indicated in the subclaims.

According to the invention, visual codes are assigned to the fitted function or to the points of the set of points piecewise or pointwise depending on the residual errors, and the fitted function is displayed graphically at an interface, wherein the fitted function is displayed piecewise or pointwise in the form of the assigned visual codes.

The visual codes can be assigned by means of a lookup table or by means of a functional relationship. In both cases, a deviation should ideally correspond exactly to a visual code. When the store of values is limited, a visual code can be assigned to a plurality of deviations or to a range of deviations. A functional relationship can be linear, for example. The advantage in using a table is that any codes can be defined easily. Accordingly, the display can be suited to specific requirements. For example, the contrast can be increased to make smaller deviations more clearly visible or reduced for a more vigorous suppression of statistical noise. The advantage in using a functional relationship is that it makes possible a quantitative evaluation of the graph when a legend or key representing the code is displayed at the same time. Mixed forms of assignment are also possible. For example, functional relationships with different value ranges can be stored in a table.

The visual code can be associated with portions or individual points of the fitted function. In addition or alternatively, visual codes can be assigned pointwise to the data points of the point set. The fitted function is then displayed in a modulated manner based on the visual code. The display can be carried out as vector graphics, raster graphics or solid modeling.

This kind of display makes it possible for the observer to discern the residuals in the graph of the fitted function and to assess the quality of the fit. The observer need not observe two graphs simultaneously, but rather only one individual graph. This has the added advantage that the graphic rendering requires less space because the separate residuals graph can be dispensed with. Alternatively, the display of the graph of the fitted function can be larger so that it can be perceived better.

Optical densities and/or color intensities and/or hues and/or color saturations are preferably used as visual codes. Visual codes of this kind are easy to see and make it possible to display a broad range of values for highly accurate reading. When optical densities are used, a color coding can be carried out for a multi-dimensional fitted function depending on one of the coordinates.

In particularly preferred embodiment forms, a first hue is assigned to visual codes for positive residual errors and a second hue is assigned to visual codes for negative residual errors. In this way, areas of the fitted function with positive residual errors can easily be distinguished from those with negative residual errors.

An intensity or a saturation of the respective visual code is advantageously determined depending on the amount of the residual error in question. In this way, the severity of the deviation of the fit from the data points can be seen easily.

The invention is particularly advantageous for two-dimensional or three-dimensional fitted functions because a perspective correlation of the residual errors from a separate graph based on the display of the visual codes within the function itself is not even necessary.

In preferred embodiment forms, the points of the point set are determined from measurement data. In so doing, a correlation of the measurement data is preferably calculated and the points of the point set are determined from grid points of the correlation. Embodiments in which the measurement data are determined by fluorescence scanning spectroscopy (FCS) and/or by raster image correlation spectroscopy (RICS) are especially preferred. The measurement data are advantageously determined by means of a laser scanning microscope (LSM). An interface of a laser scanning microscope can also be used in an advantageous manner for the display. Alternatively or in addition, a storage medium, a printer, or a display of a laser scanning microscope or of an external computer can be used as an interface for displaying.

In case of one-dimensional FCS measurement series, particularly time series, the correlation functions of the individual measurements can be displayed in a common graph by pseudo-3D rendering. In this way, the temporal flow can be displayed in case of time series.

The invention also particularly comprises an arrangement and a computer program for carrying out the different embodiments of the method.

BRIEF DESCRIPTION OF THE DRAWINGS

FIG. 2 shows a function graph and a residuals graph with a systematic error of 10%;

DETAILED DESCRIPTION OF EMBODIMENTS

Figures 1A, 1B:
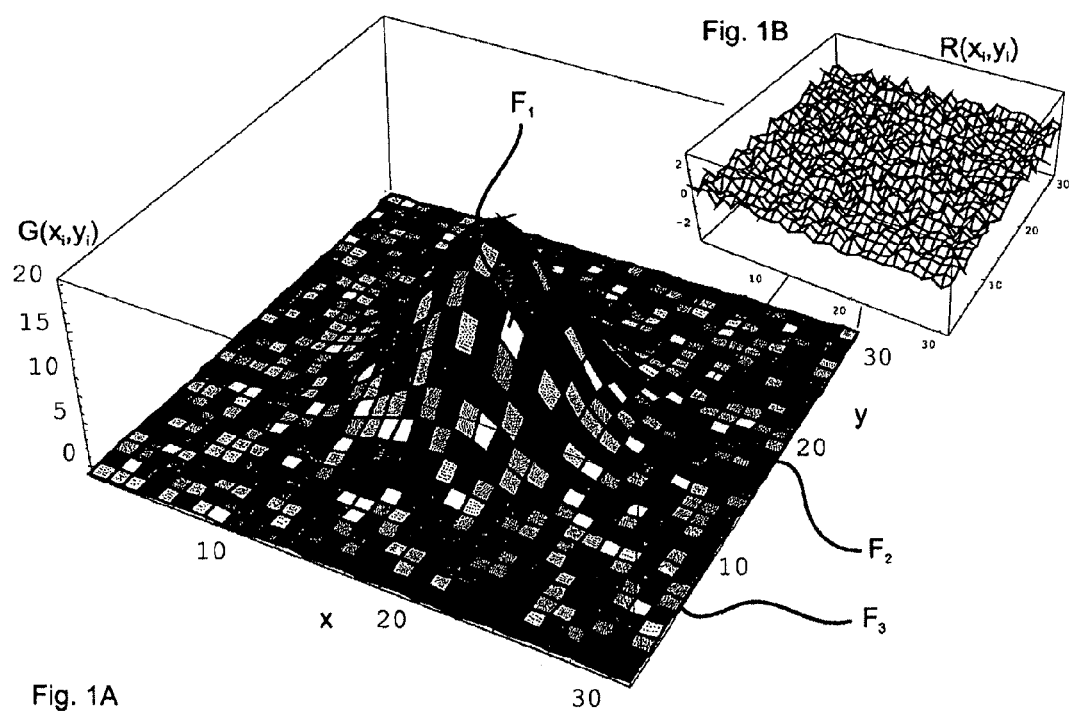
FIG. 1 shows a function graph and a residuals graph with exclusively statistical errors.
Figures 3A, 3B:
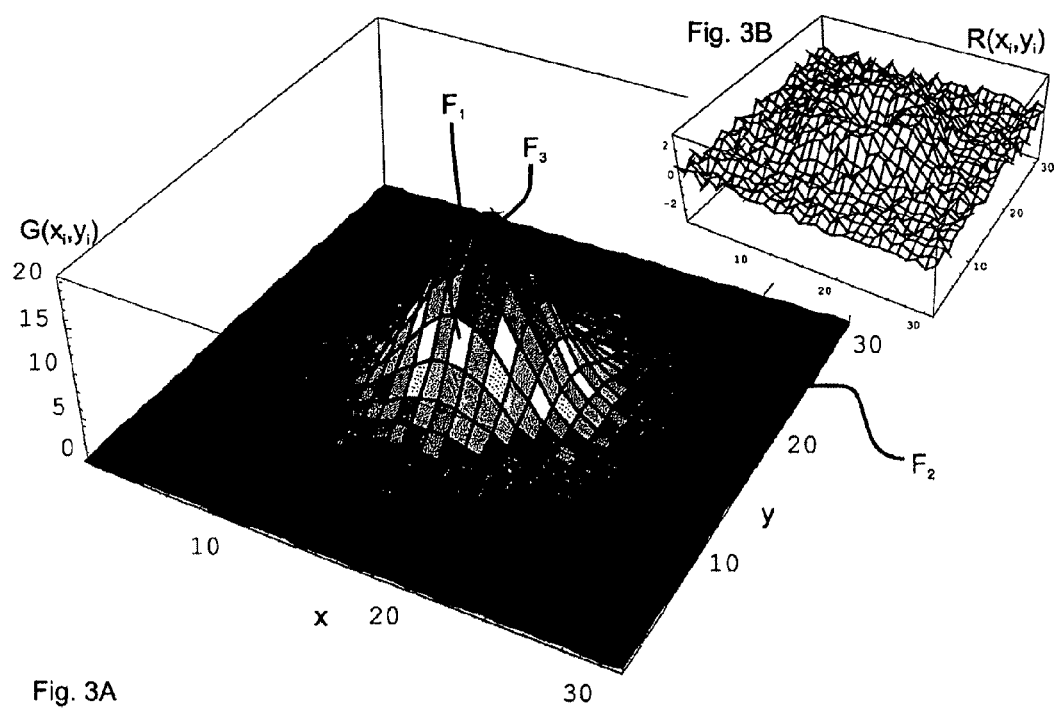
FIG. 3 shows a function graph and a residuals graph with a systematic error of 30%.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

A graph of a function $G(x,y)$ is shown in each FIG. 1A to 3A in a perspective pseudo-3D grid rendering. The respective function $G(x,y)$ is fitted by means of curve fitting calculations to a set of data points (not shown) that is identical for all of the Figures, for example, by the method of least squares deviation. The data points come from an autocorrelation calculation of a simulation of a LSM-RICS measurement on which artificial noise is superimposed. In addition, a systematic error of 10% and 30%, respectively, is artificially generated in the fits shown in FIGS. 2 and 3.

The residual errors $R(x,y)$ of the fitted function $G(x,y)$, i.e., the differences between the respective function values $G(x,y)$ and the data points contained in the point set, are shown in FIGS. 1B to 3B in perspective as independent graphs as is conventional in the art.

FIGS. 1A to 3A also show the residual errors $R(x,y)$ of the fitted function $G(x,y)$ which, in this case, however, are advantageously integrated in the function graphs through a visual coding of the grid surfaces of the fitted function $G(x,y)$. Different black-and-white patterns in different optical densities are used as visual codes. The optical densities are proportional to the amount of the respective residual error with respect to value range, for example. Residual errors with positive signs, for example, in grid face $F_1$, are coded with a low optical density with a predominantly white proportion. Residual errors with negative signs, for example, in grid face $F_2$, are coded with a high optical density with a predominantly black proportion. Residual errors close to zero, for example, in grid face $F_3$, are coded with a medium optical density with approximately identical proportions of black and white. The quality of the fit can be immediately assessed by observing the fit which is visually coded in this way. In contrast to the conventional separate display of residual errors $R(x,y)$ (FIG. 2B), even slight systematic deviations (FIG. 2A) are easily recognizable in the visually coded graph of the fitted function $G(x,y)$. In an alternative embodiment (not shown), the mathematical signs of the residual errors can be coded by two different basic black-and-white patterns, for example, hatching. The first pattern represents positive residual errors, and the second pattern represents negative residual errors. The amounts of the residual errors can in turn be coded by different optical densities. Either a discrete table or a functional relationship or a combination thereof can also be used for this partial coding and assignment.

According to the invention, the residual error graphs can be dispensed with in the display because their informational content is contained in the fitted functions. This makes more space available for the display of the function graphs.

In other embodiments (not shown), grayscales or color gradations can be used for the visual coding. Visual coding with hues is particularly advantageous because areas with positive and negative residual errors are easy to distinguish. For example, a red hue can be assigned to the fitted function $G(x,y)$ as a visual code for positive residual errors, and a blue hue can be assigned to the fitted function $G(x,y)$ as a visual code for negative residual errors. Beyond these main hues, the assignment of visual codes can be broken down to a more specific degree by assigning a saturation or intensity depending on the amount of the respective residual errors $R(x,y)$. The severity of deviations of entire ranges of the fitted function $G(x,y)$ can also be observed easily in this way.

The invention can also be used with three-dimensional fitted functions. The display can then be carried out, for example, in a pseudo-3D rendering or in a genuine 3D rendering, for example, holographically or stereoscopically, particularly as a color-coded point cloud.

Figure 4:
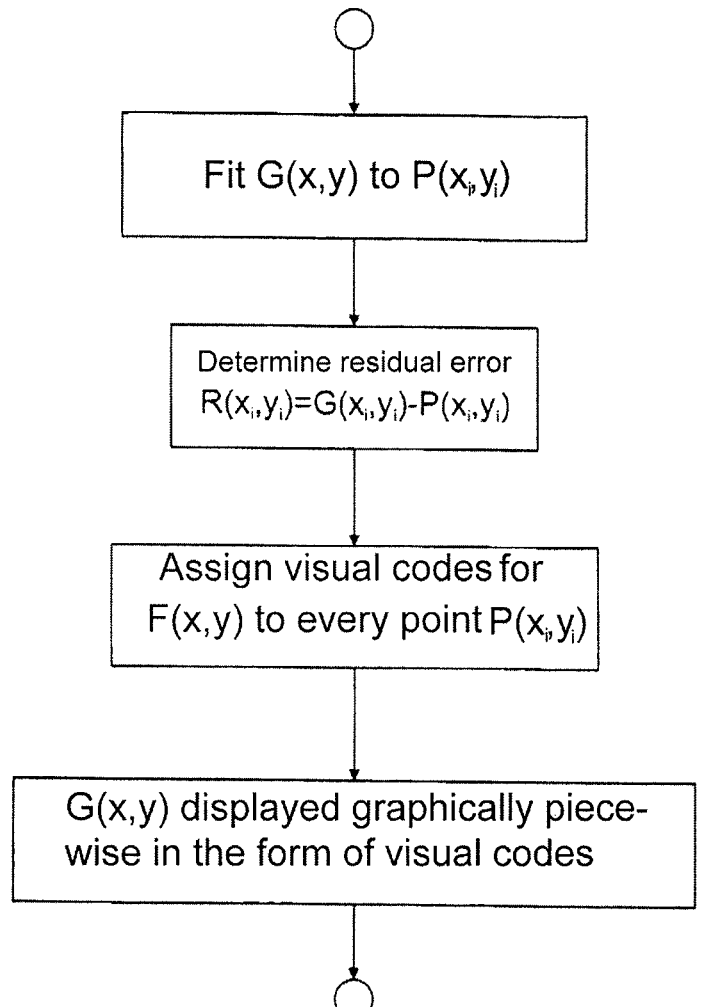
FIG. 4 shows a flow chart showing the sequence of the method.

FIG. 4 shows the sequence of the method according to the invention schematically in the form of a flow chart. A set of discrete data points $P(x_i, y_i)$ from a LSM measurement in a memory table and a parameterized function $G(x,y)$ are taken as a starting point. The parameters of function $G(x,y)$ are first fitted to the point set $P(x_i, y_i)$ by the method of least squares deviation. A residual error $R(x_i, y_i)$ is determined by subtraction $R=G-P$ for each point $P(x_i, y_i)$ of the set of points which is stored in a memory table. Visual codes are assigned piecewise to the fitted function G(x,y) for each point P($x_i$,$y_i$). The portions extend around the grid points ($x_i$,$y_i$) and correspond, for example, exactly to an individual grid face of a pseudo-3D grid. In this example, every visual code comprises a hue and a saturation depending on the mathematical sign and amount of the residual error. The function G(x,y) is then displayed, for example, on a monitor of a control computer of the LSM. In so doing, the function G(x,y) is displayed as a color-coded grid surface in the form of the visual codes. The grid lines can be displayed in black or also in colors in the visual codes. Alternatively or in addition, the visually coded fitted function can be outputted to a file or a clipboard on a storage medium or to a printer.

In an alternative embodiment (not shown), the visual codes are assigned to the fitted function only pointwise and not piecewise. The display can nevertheless be carried out piecewise in a modulated manner in the visual codes. A portion then surrounds one of the grid points ($x_i$,$y_i$), for example, symmetrically. Alternatively, the visual codes can also be assigned to the data points P($x_i$,$y_i$), for example, when the grid points ($x_k$,$y_k$) of the fitted function G(x,y) do not correspond to the data points ($x_i$,$y_i$).

In another alternative embodiment (not shown), the display in the form of visual codes can be limited to individual points of the function. In particular, these points can be points whose coordinates correspond to those of the grid points ($x_i$,$y_i$) of the data points P($x_i$,$y_i$).

Figure 5:
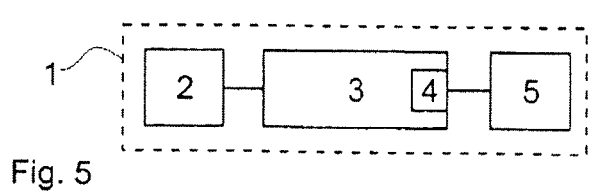
FIG. 5 shows an arrangement for carrying out the method.

FIG. 5 shows a block diagram of an arrangement 1 with a laser scanning microscope 2 which is connected to a control unit 3. The control unit 3 is outfitted with an interface 4 for a display 5. The control unit 3 is programmed to record RICS measurement data by means of the LSM 2, to calculate correlation functions, and to carry out the above-described method and displays the fitted, visually coded function G(x,y) on the display 5 when an operating action is initiated.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 arrangement
2 laser scanning microscope
3 control unit
4 interface
5 display
G(x,y) fitted function (fit)
R($x_i$,$y_i$) residual errors (residuals)
$F_{1,2,3}$ grid faces

The invention claimed is:

1. A Method for displaying residual errors of a function which is fitted to a set of points, comprising the steps of:
 calculating a correlation of the measurement data,
 determining the set of data points from grid points of the correlation;
 fitting a function to the set of data points;
 calculating the residual errors of the fitted function;
 assigning visual codes to the fitted function or to the data points of the point set piecewise or pointwise depending on the residual errors;
 displaying the fitted function graphically at an interface, wherein the fitted function is displayed piecewise or pointwise in the form of the assigned visual codes.

2. The Method according to claim 1, wherein optical densities and/or color intensities and/or hues and/or color saturations are used as visual codes.

3. The Method according to claim 2, wherein a first hue is assigned to visual codes for positive residual errors and a second hue is assigned to visual codes for negative residual errors.

4. The Method according to claim 2, wherein an intensity or a saturation of the respective visual code is determined depending on the amount of the residual error in question.

5. The Method according to claim 1, wherein a two-dimensional or three-dimensional fitted function is used.

6. The Method according to claim 1, wherein the measurement data are determined by fluorescence scanning spectroscopy and/or by raster image correlation spectroscopy.

7. The Method according to claim 1, wherein the measurement data are determined by means of a laser scanning microscope.

8. The Method according to claim 1, wherein an interface of a laser scanning microscope is used for the display.

9. The Method according to claim 1, wherein a storage medium, a printer, or a display of a laser scanning microscope or of an external computer is used as an interface for the display.

10. A non-transitory computer-readable storage medium in which a computer-readable program for performing a method for displaying residual errors of a function which is fitted to a set of points, the computer-readable program performing the steps of:
 calculating a correlation of the measurement data,
 determining the set of data points from grid points of the correlation;
 fitting a function to the set of data points;
 calculating the residual errors of the fitted function;
 assigning visual codes to the fitted function or to the data points of the point set piecewise or pointwise depending on the residual errors;
 displaying the fitted function graphically at an interface, wherein the fitted function is displayed piecewise or pointwise in the form of the assigned visual codes.

11. An apparatus adapted to display residual errors of a fitted function, the apparatus comprising:
 a control unit; and
 an output interface,
 wherein the control unit is adapted to
  calculate a correlation of the measurement data,
  determine the set of data points from grid points of the correlation;
  fit a function to the set of data points;
  calculating the residual errors of the fitted function; and
  assign visual codes to the fitted function or to the data points of the point set piecewise or pointwise depending on the residual errors,
 wherein the output interface is adapted to display a graph of the fitted function at an interface, and
 wherein the output interface is configured to display the fitted function piecewise or pointwise in the form of the assigned visual codes.

12. The apparatus according to claim 11,
wherein the visual codes are optical densities and/or color intensities and/or hues and/or color saturations.

13. The apparatus according to claim 12,
wherein the control unit assigns a first hue to visual codes for positive residual errors and a second hue to visual codes for negative residual errors.

14. The apparatus according to claim 12,
wherein the control unit determines an intensity or a saturation of a respective visual code depending on the amount of the residual error in question.

15. The apparatus according to claim 11,
wherein the fitted function is two-dimensional or three-dimensional.

16. The apparatus according to claim 11,
wherein the control unit determines the measurement data by fluorescence scanning spectroscopy and/or by raster image correlation spectroscopy.

17. The apparatus according to claim 11,
wherein the apparatus is a laser scanning microscope or a control computer for a laser scanning microscope.

18. The apparatus according to claim 11,
wherein the interface is a storage medium, a printer, or a display of a laser scanning microscope or of an external computer.

* * * * *